July 28, 1970   H. W. NICKEL   3,521,604
VESSEL HAVING A FOAM POLYURETHANE OUTER LAYER
Filed Jan. 29, 1968
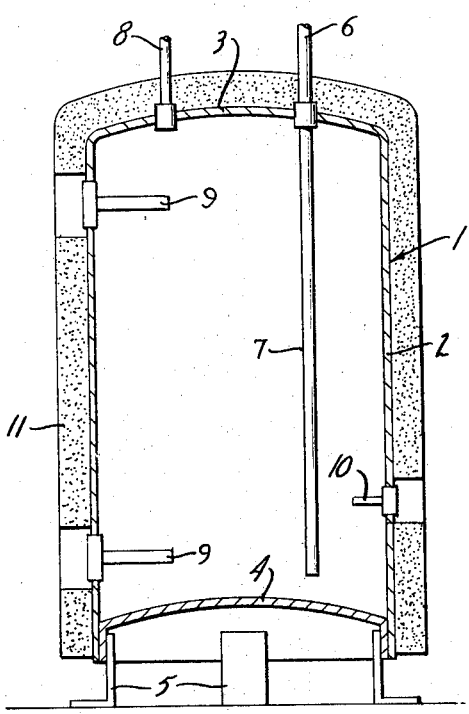
FIG_1
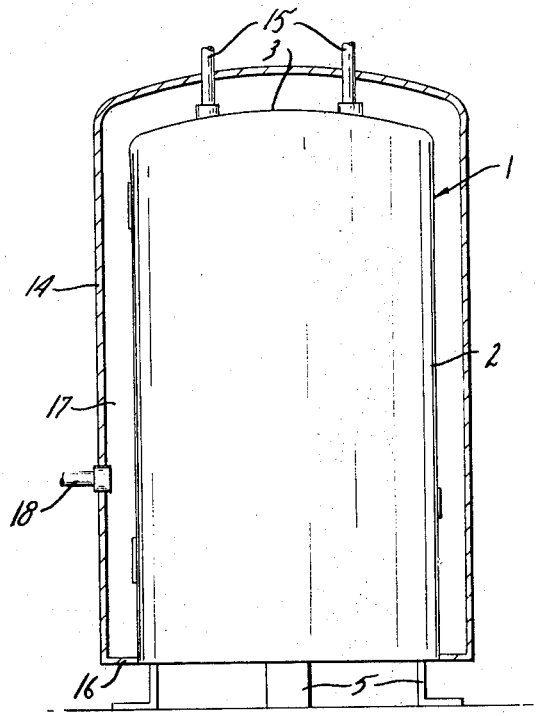
FIG_3
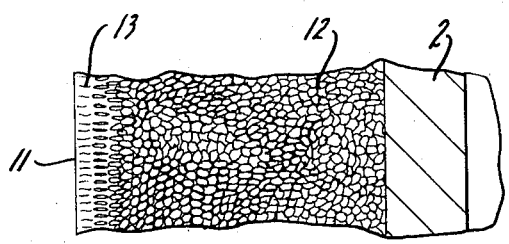
FIG_2
INVENTOR.
HERBERT W. NICKEL
BY
Andrus & Starke
Attorneys

United States Patent Office 3,521,604
Patented July 28, 1970

3,521,604
VESSEL HAVING A FOAM POLYURETHANE OUTER LAYER
Herbert W. Nickel, Germantown, Wis., assignor to A. O. Smith Corporation, Milwaukee, Wis., a corporation of New York
Filed Jan. 29, 1968, Ser. No. 701,405
Int. Cl. F22b 7/00
U.S. Cl. 122—13                    10 Claims

ABSTRACT OF THE DISCLOSURE

The invention relates to a vessel, such as a hot water heater, adapted to contain a heated material, and including a steel tank having a layer of polyurethane foam bonded to the outer surface of the tank. The foam is an open cell type having a composite density of 4 to 15 pounds per cubic foot, and having a hard, yet ductile, outer skin.

The foam layer provides a decorative appearance for the water heater, as well as serving as a heat insulating medium and protecting the tank from damage during shipment.

---

A conventional hot water heater includes a steel tank to contain the water to be heated and the tank is surrounded by a sheet metal casing. To provide an insulating barrier, a layer of fibrous glass insulation is located within the space between the tank and the outer casing. Applying the sheet metal casing and insulating layer to the tank requires considerable hand labor, for it is necessary to lay the glass batts around the tank manually and then to assemble the casing around the insulating layer. To obtain the necessary insulating effect in the conventional hot water heater, the insulating layer may be up to two inches or more in thickness and this substantially increases the overall size of the heater and thereby increases storage and handling problems.

As a further problem, the sheet metal casing of the conventional hot water heater is made of relatively light gauge metal and is frequently bent or damaged during shipment. While a bend in the casing will normally not interfere with the operation of the hot water heater, the bend will make the unit unmarketable. Thus, extreme care must be taken in packing the conventional hot water heater to prevent damage to the sheet metal casing and this increases the cost of packaging and shipping.

The present invention is directed to a hot water heater in which a layer of polyurethane foam is bonded directly to the outer surface of the steel tank. The foam is an open cell variety, and is provided with a relatively hard, ductile, outer skin, while the inner surface of the foam layer bonded to the tank is substantially free of a skin. The composite density of the foam throughout its thickness is in the range of 4 to 15 pounds per cubic foot, with the inner core of the foam layer having a density generally in the range of about 2 to 6 pounds per cubic foot, and the outer surface of the skin having a density up to 75 pounds per cubic foot, and generally in the range of 20 to 60 pounds per cubic foot.

The hard, ductile, outer surface of the foam layer provides a decorative effect for the hot water heater, and if pigmentation is used in the resin, no painting is required. Moreover, the hard skin on the outer surface of the foam layer increases the abrasion resistance. The foam layer has excellent resistance to shock so that it will not deform or dent under shock loads as may occur during shipment and handling.

As the foam layer is bonded directly to the steel tank, an increased insulating effect is provided. Bonding of the foam to the tank eliminates the air film at the interface between the foam and the tank which is present when using a loose layer of fibrous insulation as in a conventional hot water heater. As the insulating effect is increased by use of the bonded foam, the thickness of the insulating layer can be correspondingly reduced to achieve the same insulating effect as in a conventional heater and this serves to reduce the overall size of the hot water heater.

During service, water may be present at the interface between the tank and the foam layer due to leakage through the tank wall, or due to leakage from the pipe nipples or due to condensation from the pipe nipples. In addition, some water vapor may be present in the cells, depending on the foaming procedure employed. As the foam layer is of the open cell variety, a substantial proportion of the cell walls are ruptured so that there is communication between cells. Thus, when the tank is heated, the water vapor or other gas at the interface and within the foam structure will tend to expand and due to the open cell structure, the increased vapor pressure can be vented to the atmosphere without danger of rupture of the foam and without the formation of blisters or gas pockets in the foam layer.

Other objects and advantages will appear in the course of the following description.

The drawings illustrate the best mode presently contemplated of carrying out the invention.

In the drawings:

FIG. 1 is a vertical section of a typical hot water heater incorporating the invention;

FIG. 2 is a fragmentary enlarged vertical section showing the foam layer bonded to the steel tank; and FIG. 3 is a diagrammatic representation of the apparatus for molding the foam layer to the tank.

FIGS. 1 and 2 illustrate a typical electric water heater including a steel tank 1 to contain the water to be heated which is usually at a temperature in the range of 140° F. to 180° F. The tank 1 comprises a generally cylindrical shell 2 having its upper end enclosed by an upper head 3 and its lower end enclosed by a lower head 4. The tank is supported from the ground by a series of legs 5.

Water to be heated is introduced into the tank through an inlet pipe 6 which is connected to a dip tube 7 that extends downwardly to a location above the lower head 4. Heated water is withdrawn from the tank through an outlet pipe 8 connected to a fitting in the upper head 3.

To heat the water within the tank, a pair of electrical heating elements 9 are positioned within the tank at spaced vertical locations, and the elements are controlled in a conventional manner by a thermostat 10.

According to the invention, a layer 11 of polyurethane foam is bonded to the outer surface of the shell 2, as well as to the outer surface of the upper head 3. As best shown in FIG. 2, the layer 11 includes a low density core 12 and a relatively hard outer skin 13. There is no sharp line of demarcation between the skin 13 and the core 12, for there is a gradient between the two. However, reference to the "skin" is intended to mean that layer of the foam having a density in excess of 20 pounds per cubic foot. Thus, the skin or that portion of the layer 11 having a density greater than 20 pounds per cubic foot has a thickness in the range of 5 to 60 mils and preferably from 5 to 15 mils. The overall thickness of the layer 11 can vary widely, depending on the particular application and the temperatures to be encountered. Generally, the layer 11 will have a thickness in the range of ⅝ inch to 2 inches.

The foam layer 11 has a composite density, meaning the density of the entire thickness of the foam, in the range of 4 to 15 pounds per cubic foot, and preferably within the range of 4 to 8 pounds per cubic foot. The density of the foam throughout the thickness of layer 11 graduates with the skin having a density of up to 75 pounds per cubic foot and generally in the range of 20 to 60 pounds per cubic foot, while the core 12 has a density generally in the range of 1½ to 8 pounds per cubic foot, and preferably in the range of about 2 to 4 pounds per cubic foot.

The foam layer 11 itself, including the core 12 and skin 13, has a moisture permeability greater than 5 grains of water transmitted per square foot per hour per inch of mercury, and has a K factor generally in the range of 0.16 to 0.24 B.t.u. per square foot per inch per °F. Under an impact force of 30 ft.-lb. per inch as developed by a 2¾ inch diameter, 3 lb. steel ball, no structural damage was produced in the foam layer and the foam completely recovered without permanent deformation. The foam layer also has excellent water and heat resistance. After exposure on one side to 180° F., 100% relative humidity water vapor for one hour, no cracking or deterioration of the foam was noted. The volume increase after the one hour exposure period was less than 2% and the weight increase after the exposure period was less than 3%. In regard to heat resistance, after exposure for six months at 200° F., no cracking and only a slight darkening in color was noted. The volume increase after the exposure period of six months was less than 3% and the weight decrease after the exposure period was less than 1%.

While the outer surface of layer 11 is provided with a hard, yet flexible, skin 13, the inner surface of layer 11 which is bonded to the tank 1 is not provided with an appreciable skin, and this not only increases the heat insulating effect of the foam layer 11, but provides definite economies in the molding operation. From a practical standpoint, it is not possible to eliminate all skin formation on the inner surface of layer 11. Nevertheless, it is important to keep the skin formation on the inner surface at a minimum thickness, less than 5 mils, in order to achieve the optimum heat insulating effect and economies in molding.

The polyurethane foam is of the open cell type, and the open cell structure can be provided by use of surfactants and certain catalysts as is well known in the art. With the open cell structure, a substantial proportion generally above 80%, of the cell walls are ruptured so that there is communication between cells. Thus, the entire foam layer is porous, including the skin 13, so that water vapor and other fluids can pass through the foam layer. Even though the skin 13 is porous, it appears to the naked eye to be a hard, continuous, dense layer.

The open type of cell structure has definite advantages when the foam is applied to a heated element such as a hot water tank. If the cells are of the closed type, water at the interface between the tank and the foam layer and resulting from leakage and condensation will tend to diffuse into the closed cells bordering the tank. When the tank is heated, the vapor pressure of the water vapor at the interface, as well as within the cells, can increase to a point where the cells will virtually explode or rupture, thereby disfiguring the outer appearance of the layer 11. Moreover, in some cases, the increase in vapor pressure within closed cells can cause blistering or expansion of certain areas of the foam layer 11. Therefore, it is important that the foam layer be an open cell type so that excessive vapor pressure developed within the cells can be readily vented to the exterior.

The polyurethane foam is a conventional type produced by the reaction of an isocyanate with a suitable hydroxyl bearing compound, with the reaction employing some method of gas formation to make the foamed material. Urethane polymers are most commonly prepared by reacting a diisocyanate with a hydroxyl terminated polyether or polyester. Polyesters which can be used include those based on adipic acid, dimer acid or castor oil, while the polyethers include propylene glycols of molecular weights up to 2000 and triols with molecular weights up to 5000 that are propylene oxide adducts of glycerine.

As a specific example, the polyurethane foam can be prepared by reacting polytetramethylene ether glycol with 2,4-toluene diisocyanate. Other specific polyurethane systems are disclosed in Pats. 2,920,983, 2,850,464 and 2,740,743.

The properties of the foam can be varied widely by changing the relative amounts of the reactants, and through proper blending of the ingredients, a wide variety of physical properties can be obtained. In addition, a catalyst such as a tertiary amine is generally used to accelerate the reaction between the isocyanate and the hydroxyl bearing compound.

In one method of forming the polyurethane foam, the organic polyisocyanate, preferably a diisocyanate, is contacted with the polyester or polyether and a small amount of water is admixed with the polyester. A suitable cross linking agent, such as 1,3 propylene glycol and a reaction catalyst such as certain tertiary alkyl amines, are mixed with the polyester. Carbon dioxide is evolved during the polymerization and the evolution of the carbon dioxide provides the foamed nature for the polyurethane resin.

In another method of producing polyurethane foam, a liquified gas such as a fluorocarbon is dispersed in the polyol and serves as the blowing agent. With the use of a fluorocarbon gas, such as monofluorochloromethane or difluorochloromethane, the exothermic reaction will vaporize the fluorocarbon gas to provide the foamed structure.

As previously mentioned, the foam layer 11 is provided with a relatively hard, outer skin 13, and the skin can be formed by a number of methods such as, for example, those described in U.S. Pat. 3,099,516 and 3,178,490. In the method described in Pat. 3,099,516, the temperature of the mold is reduced below the temperature necessary for effective vaporization of the fluorocarbon gas, with the result that the gas along the surface of the mold will not be vaporized and a hard, dense surface skin will be formed. In the method described in Pat. 3,178,490 the closed mold is overcharged with the reaction mixture, and during polymerization within the closed mold, a hard surface layer is provided.

In the present invention, a combination of these methods is utilized to provide the dense hard skin 13. In addition, the tank 1 which serves as the inner mold surface for the foamed layer 11 is heated to a temperature substantially above that of the outer mold in order to minimize the formation of a hard dense skin on the inner surface of the foam layer which is bonded to the tank 1. Generally speaking, the mold 14 is heated to a temperature in the range of 75° F. to 125° F., while the tank 1 is heated to a higher temperature generally in the range of 110° F. to 180° F., and at least 20° F. higher than the temperature of the mold 14. In addition, the mold is slightly overcharged with the reaction mixture, with the closed mold containing approximately 1½ to 3 times the formulation weight normally required to produce a foamed mass having a density of approximately 2 to 4 pounds per cubic foot. Under these reaction conditions, the outer surface of the layer 11 will form a hard dense skin 12, while the inner surface of the layer 11 will be cellular with a minimum skin, due to the fact that the temperature of tank 1 is sufficiently high to permit the liquified fluorocarbon gas along the surface of the tank to vaporize, even though the reaction mixture is overcharged.

Generally the density of the foam layer 11, as well as the skin thickness, is regulated by the temperature of the mold and the tank, the pressure of the resin, the type of resin used and the blowing agent.

The structure utilized in molding is shown diagrammatically in FIG. 3. The tank 1 is indexed within the outer mold 14 by studs 15 which are threaded in the fittings in the upper end of the tank and extend upwardly through holes in the mold 14. The mold 14 is formed of several removal sections which are bolted or otherwise secured together around the tank. Extending inwardly from the lower end of mold 14 is an annular flange 16 which is sealed against the lower extremity of tank 1. Suitable inserts can be positioned within the cavity 17 between tank 1 and mold 14 to provide non-foamed areas for access panels and the like.

The outer surface of the tank 1 is cleaned to remove all oil, scale and the like, and a conventional release agent is applied to the inner surface of the mold 14.

As previously mentioned, the mold 14 is heated to temperatures in the range of 75° F. to 150° F. and the tank 1 is heated to a higher temperature in the range of 110° F. to 180° F. The liquid resin mixture is then introduced into the closed cavity 17 through a line 18 secured within an opening in the mold. During the foaming operation, the air originally in the cavity 17 is bled from the upper end of the mold 14 through a suitable vent, not shown.

After the foaming is completed, the foamed layer is maintained within the mold for a period of about 3 to 15 minutes to cure the resin. After curing, the mold 14 is stripped from the foamed layer which is integrally bonded to the tank.

A specific example of forming the water heater of the invention is as follows:

A polyol phase was prepared by mixing 100 parts of a 4500 molecular triol with 23 parts of a primary amine LD-813 (Du Pont de Nemours, E. I. & Co.), 1 part of a surfactant DC-200, 50 centistokes (Dow Corning Corp.), 1 part of a primary catalyst Dabco 33LV (Houdry Processing and Chemical Co.) and .03 part of a secondary catalyst dibutyl tin dilaurate.

A diisocyanate phase was prepared by mixing 23 parts of isocyanate Hylene TM-65 (Du Pont de Nemours, E. I. & Co.) with 12 parts of Freon 11 (Du Pont de Nemours, E. I. & Co.).

The polyol phase, at a temperature of about 100° F., was mixed with the isocyanate phase, at a temperature of about 75° F., and the reaction mixture was then charged into the mold cavity in an amount of about 3 times the formulation weight normally required to produce a free rise foam density of approximately 4 pounds per cubic foot. The tank, at the time of charging, was at a temperature of 150° F. and the mold was at a temperature of 120° F.

The foamed resin was maintained in the mold for 5 minutes and the mold was then stripped from the tank. The resulting foamed polyurethane layer was an open cell structure and had a smooth, hard, dense outer skin and a low density, resilient core. The overall or composite density of the foam layer was in the range of 10 to 12 pounds per cubic foot, while density of the core was in the range of 6 to 8 pounds per cubic foot.

As the foam layer 11 is bonded to the steel tank, the insulating effect provided by the polyurethane foam is substantially greater than that of a layer of loose fibrous insulation of the same thickness. For example, it has been found that a ⅝ inch thick slab of the foam layer 11 has the same heat insulating properties as a 1 inch thick batt of fiber glass insulation. As the foam layer 11 is bonded to the tank, no air film is present at the interface and this will increase the overall heat insulating properties of the foam layer 11 as compared to fiber glass insulation, for an air film is present in a fiber glass insulated structure and this reduces the overall insulating properties of the structure.

The hard, outer skin 13 not only provides a decorative effect for the tank, but provides a relatively hard and durable surface layer which is resistant to abrasion. The foam layer itself has excellent impact resistance and this is an important factor in reducing damage to the tank during packaging, shipping and handling.

As the polyurethane foam layer is an open cell type, the increased vapor pressure generated during heating by any water vapor present at the interface between the tank and the foam layer resulting from leakage or condensation, or any water vapor present in the cells will be freely vented to the exterior to thereby prevent disfigurement of the foam layer during service.

While the above description is directed to a domestic hot water heater, it is contemplated that the invention is applicable to the production of various types of tanks or containers and is particularly applicable to tanks adapted to contain heated materials in service.

Various modes of carrying out the invention are contemplated as being within the scope of the following claims, particularly pointing out and distinctly claiming the subject matter which is regarded as the invention.

I claim:

1. A structure to contain a material, comprising a metal tank to contain a material, and a layer of polyurethane foam bonded to the outer surface of the tank, said foam having an open cell structure permeable to vapor and having a composite density in the range of 4 to 15 pounds per cubic foot, said foam layer having a relatively hard and dense outer skin and having a low density cellular portion extending from said skin to said tank.

2. The structure of claim 1, wherein the low density portion of said polyurethane foam layer has a density in the range of 1½ to 8 pounds per cubic foot and the inner surface of said portion is bonded to said tank and is substantially free of a hard and dense skin.

3. The structure of claim 2, wherein said skin has a density greater than 20 pounds per cubic foot.

4. The structure of claim 1, wherein that portion of said layer having a density greater than 20 pounds per cubic foot has a thickness in the range of 5 to 60 mils.

5. The structure of claim 1, wherein the tank is steel and the material is hot water.

6. The structure of claim 1, wherein at least 80% of the cell walls of the foam layer are open to provide communication between cells.

7. The structure of claim 1, wherein the foam layer has a moisture permeability greater than 5 grains of water transmitted per square foot per hour per inch of mercury.

8. A hot water heater, comprising a steel tank to contain heated water, means for heating the water in the tank, and a layer of polyurethane foam bonded to the outer surface of the tank, said foam layer having an open cell structure permeable to vapor and having a composite density in the range of 4 to 15 pounds per cubic foot, said foam layer including a thin hard dense outer skin having a density greater than 20 pounds per cubic foot and said foam layer including an inner low density section extending from the skin to said tank and having a density in the range of 1½ to 8 pounds per cubic foot, said skin having a thickness in the range of 5 to 60 mils.

9. The water heater of claim 8 wherein said tank comprises a generally cylindrical shell and an upper head enclosing the upper end of said shell and said foam layer substantially covers the outer surface of the shell and the outer surface of said upper head.

10. The hot water heater of claim 8, wherein at least 80% of the cell walls of the foam layer are open to provide communication between cells, and the foam layer has a moisture permeability greater than 5 grains of water transmitted per square foot per hour per inch of mercury.

References Cited

UNITED STATES PATENTS

| | | | |
|---|---|---|---|
| 2,099,740 | 11/1937 | Kieselbach | 122—494 |
| 3,275,798 | 9/1966 | Martin | 122—13 X |

EDWARD G. FAVORS, Primary Examiner

U.S. Cl. X.R.

122—494

UNITED STATES PATENT OFFICE
CERTIFICATE OF CORRECTION

Patent No. 3,521,604            Dated July 28, 1970

Inventor(s) H. W. Nickel

It is certified that error appears in the above-identified patent and that said Letters Patent are hereby corrected as shown below:

Column 1, line 43, cancel "unmargetable" and substitute therefor (unmarketable)

Column 6, line 19, after "foam", second occurrence, insert (layer)

SIGNED AND SEALED
DEC 22 1970

(SEAL)
Attest:

Edward M. Fletcher, Jr.
Attesting Officer

WILLIAM E. SCHUYLER, JR.
Commissioner of Patents